United States Patent [19]

Kasmarik

[11] 4,112,677

[45] Sep. 12, 1978

[54] THRUST SPOILER FOR TURBOFAN ENGINE

[75] Inventor: Joseph R. Kasmarik, Stratford, Conn.

[73] Assignee: Avco Corporation, Stratford, Conn.

[21] Appl. No.: 763,770

[22] Filed: Jan. 31, 1977

[51] Int. Cl.² .................................................. F02K 3/06
[52] U.S. Cl. ................................ 60/226 R; 239/265.37
[58] Field of Search ............ 60/226 A, 226 B, 226 R, 60/229, 230, 262; 239/265.13, 265.37

[56] References Cited

U.S. PATENT DOCUMENTS

| 1,190,365 | 5/1970 | Davies | 60/226 R |
|---|---|---|---|
| 2,873,576 | 2/1959 | Lombard | 60/226 B |
| 3,316,717 | 5/1967 | Castle et al. | 60/226 B |
| 3,483,702 | 12/1969 | Ward | 60/229 |
| 3,500,644 | 3/1970 | Hom et al. | 60/229 |
| 3,500,646 | 3/1970 | Hom et al. | 60/229 |
| 3,937,013 | 2/1976 | Aspinwall | 60/226 B |

*Primary Examiner*—Robert E. Garrett
*Attorney, Agent, or Firm*—Ralph D. Gelling

[57] ABSTRACT

A multiplicity of retractable spoilers are placed at spaced angular intervals within the annular duct which carries the bypass airstream in a turbofan engine. Deployment of the spoilers into the bypass annular duct causes a partial blockage of the airstream. This results in a decrease in thrust from the engine without any change in throttle setting.

7 Claims, 3 Drawing Figures

THRUST SPOILER FOR TURBOFAN ENGINE

BACKGROUND OF THE INVENTION

The forward fan high bypass engine incorporates a gas producer unit which is furnished air from a compressor that is driven by a turbine. Extending forward of the compressor is a shaft which through reduction gearing drives a large diameter ducted fan. The fan rotates in an annular duct which is a continuation of the air intake. The airstream accelerated by the fan is divided. One part of the airstream (primary air) is fed to the compressor to provide an air supply for the gas producer unit. The other part of the airstream (secondary air) bypasses the gas producer through an annular duct which surrounds the turbine. In some turbofan engines this portion of the airstream is ejected directly as a "non-mixed" exhaust. In other engines the bypassing airstream is "mixed" with the gas-generator exhaust at the core engine jet nozzle. The object of the bypass system is to combine the good operating efficiency and high thrust capability of a turboprop and the high speed, high altitude capability of a turbojet while achieving lower fuel consumption.

This invention provides a means for reducing the thrust output of the bypassing portion of the engine airstream at low throttle settings. The requirement to reduce thrust materializes when an aircraft equipped with high bypass fan engine(s) is waiting in line on a taxi strip or airport apron. The thrust of a high bypass engine, even at idle power setting, can be sufficient to cause the aircraft to move forward unless the flight crew maintains constant brake pressure. This task, when the aircraft encounters long waiting periods for take-off clearance, increases crew fatigue and interferes with normal pre-flight check lists and communications.

A prior art system of engine thrust control is described on page 118 of R. A. Fry's book titled "The Principles and Construction of Aircraft Gas Turbines", published by Sir Isaac Pitman and Sons, Ltd., London, 1960. In the system described by Fry, there is a ring of non-rotating guide vanes placed in front of the mechanically driven fan. The angle of incidence of these guide vanes can be varied to suit changing operating conditions.

There is a drawback to this approach which my invention overcomes. In the system described by Fry, varying the pitch of the entry vanes changes the amount of air going to both the gas producer and the bypass ducts. With the airstream going to the gas producer choked down the pilot will have to change throttle settings to maintain efficient conditions in the turbine. In addition, the inlet vanes must be anti-iced, which adds considerable complexity to the engine system. Using my invention, the air intake of the gas producer section is not disturbed when the thrust spoilers are activated. Thus, no change in throttle setting of the engine is required.

SUMMARY OF THE INVENTION

A multiplicity of retractable flaps are placed in the outer wall of the air bypass ducting in a turbofan engine. When deployed into the bypass air passageway the flaps act as thrust spoilers in that they both partially block the air passageway and at the same time create turbulent flow conditions within the passageway. The flaps are positioned downstream from the air inlet to the gas producer section of the turbine. This precludes performance degradation of the gas producer section of the engine when the flaps are deployed. In the unit reduced to practice the thrust spoiler flaps were positioned so that the hinge pin of each flap was in a plane perpendicular to the axis of the turbine. Collectively, the hinge pins and extensions thereof formed a circumferential ring around the periphery of the bypass duct. This allowed the flaps to be mechanically interconnected so that they could be actuated in synchronism. The flaps were positionable in two states. In one state they were recessed in and flush with the outer wall of the bypass duct. In the other, they were rotated 90° around the hinge pin from the recessed position so as to interrupt air flow in the bypass duct to the maximum extent possible. This means 90° rotation of the flap around the hinge pin from the retracted to the actuated state. The flaps were symmetrically positioned around the bypass passageway. For the case where four thrust spoilers were used, each was spaced so that their center lines were at 90° intervals. When six thrust spoilers were used, 60° intervals between center lines was selected.

Actuation and retraction of the thrust spoiler flaps can be achieved by either gear or crank arm drive means. Through mechanical linkages one actuating mechanism can be made to simultaneously operate all or several thrust spoilers. Alternatively, each thrust spoiler might have its own actuating drive source.

DESCRIPTION OF THE PREFERRED EMBODIMENT

Figure 1:
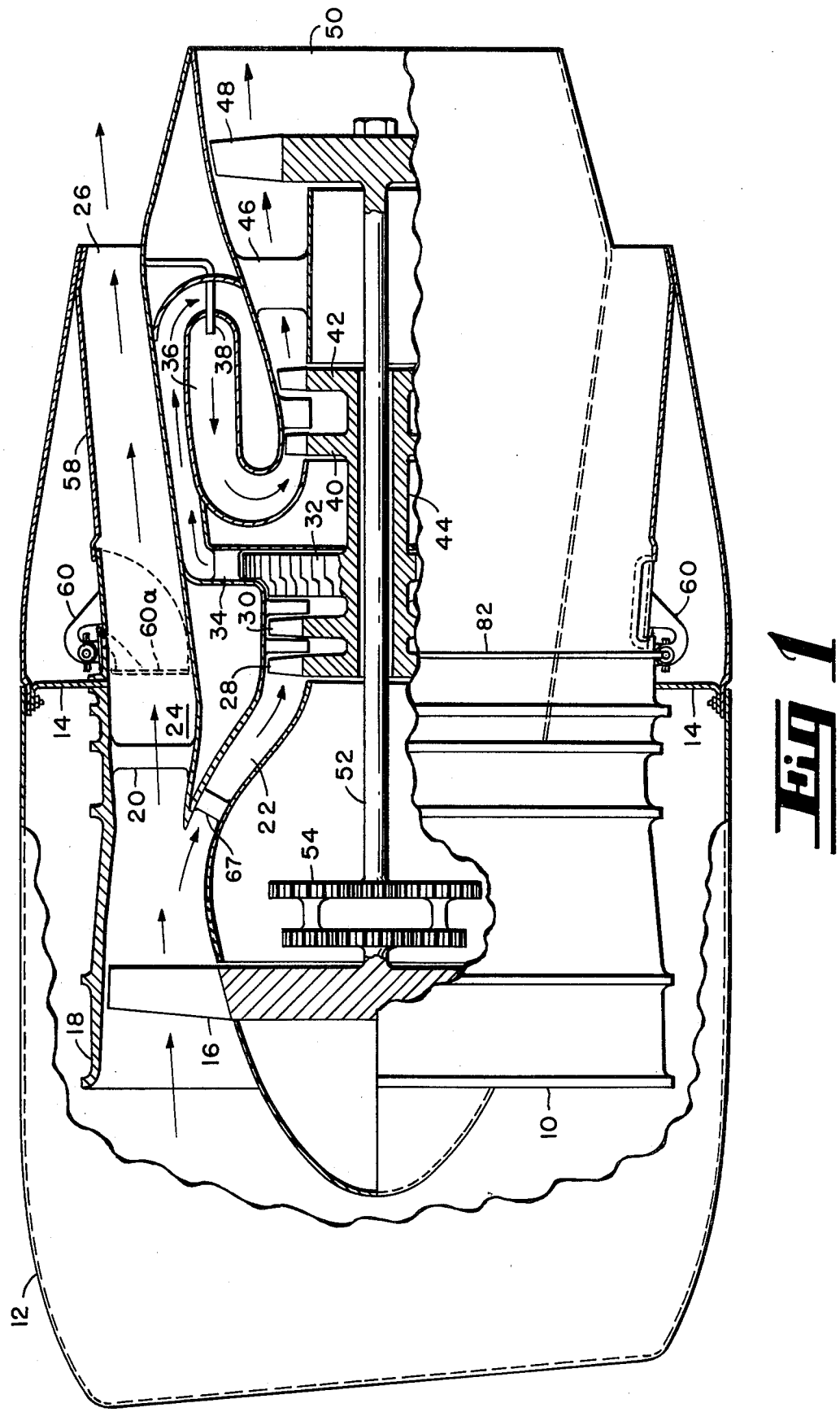
FIG. 1 is a cross-sectional view of a turbofan engine with partial cutaways showing the gas producer section surrounded by a bypass duct in which there is a thrust spoiler.

In FIG. 1, turbofan engine 10 is shown positioned within nacelle 12. Brackets 14 connect nacelle 12 to engine 10, and allows the aft portion of the nacelle to be removed to provide access to spoiler components. The turbofan engine 10, shown in cutaway view in FIG. 1, is typical of high bypass ratio units having a single front-mounted ducted fan stage 16. Fan stage 16 rotates in annular duct 18 which is a continuation of the engine air intake. The stream of air accelerated by fan stage 16 is divided. "Primary" air enters passageway 22, passes over fixed guide vanes 67, and enters the compressor. "Secondary" air passes over fixed guide vanes 20 and is fed through annular duct 27 for eventual discharge at nozzle 26 as a cold gas stream.

In the FIG. 1 arrangement, fan stage 16 supercharges compressor stages 28 and 30. Air from compressor stage 30 is forced radially outward by impeller blades 32 so as to pass through diffuser 34. High pressure air from diffuser 34 flows through orifices into combustor 36. Fuel enters combustor 36 through nozzles 38. The hot gases from the combustor drive turbine blade stages 40 and 42. Power absorbed from the hot gas stream by turbine stages 40 and 42 is used to drive the compressor stages via tubular shaft 44.

Hot gases leaving turbine stage 42 pass through fixed guide vanes 46 and on into turbine stage 48. Power absorbed by turbine stage 48 serves to drive input fan stage 16 via shaft 52 and reduction gearing 54. Hot gases leaving turbine stage 48, and exiting at tailpipe 50, provide a small portion of overall engine thrust.

Recessed in outer wall 58 of annular duct 24 there are a multiplicity of thrust spoilers 60. Thrust spoilers 60 can be actuated to the 60a position (see dashed line position near top center of FIG. 1). In the actuated position 60a, the thrust spoilers partially block the bypass air flow passage, greatly reducing output thrust at annular cold jet nozzle 26. However, actuation or retraction of thrust spoilers 60 causes very little change in the operation of the gas producer section of the turbine. This is because the thrust spoilers 60 are downstream from the inlet passageway 22 which furnishes air to the gas producer. The net result is that use of my invention allows reduction of engine thrust, through activation of thrust spoilers, with the engine at minimum operating speed.

Figure 2:
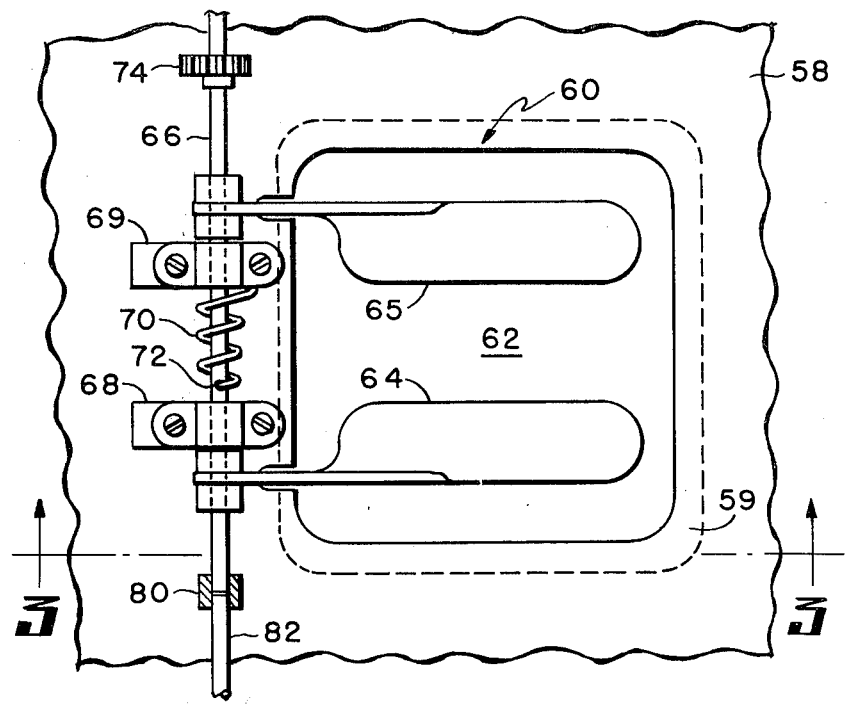
FIG. 2 is a top view of one of the thrust spoilers as it appears when seen from the outside of the bypass passageway.
Figure 3:
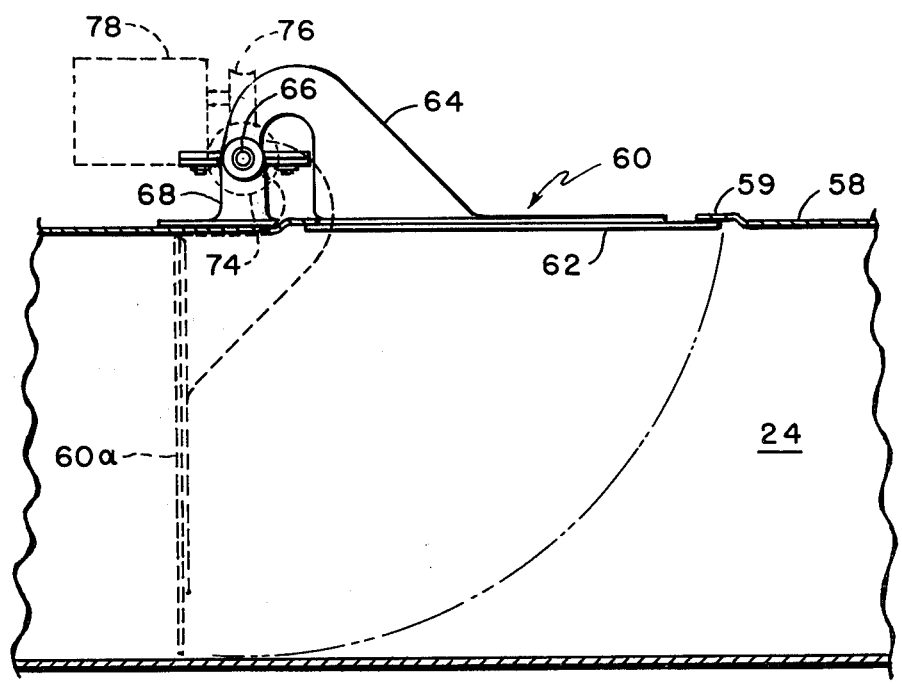
FIG. 3 is a side view of one of the thrust spoilers taken along line 3—3 of FIG. 2.

FIGS. 2 and 3 show one of the thrust spoilers 60 in more detail. Thrust spoiler 60 comprises a generally rectangular plate 62 to which are fastened mounting brackets 64 and 65. Mounting brackets 64 and 65 are pivotally mounted via hinge pin 66 to supports 68 and 69. Supports 68 and 69 are attached to the outer side 58 of the annular bypass duct 24. Mounting brackets 64 and 65 may be attached to plate 62 by any appropriate means such as, for example, spot welding. In a like manner, supports 68 and 69 may be attached to wall 58 by welding or other well-known methods. It is to be understood that brackets 64 and 65 are both firmly attached to hinge pin 66 and that hinge pin 66 is readily rotatable in supports 68 and 69. Fluting of the hinge pin 66 in the areas enclosed by mounting brackets 64 and 65 is one way to accomplish firm attachment. Use of coil spring 70 which at one end is anchored in hole 72 formed in hinge pin 66 and at the other end is anchored to support mount 69, provides a restoring torque to keep the thrust spoiler 60 in the recessed position shown in FIG. 2.

Power to actuate the thrust spoilers 60 may be implemented in any of several ways. An electric motor method is shown in FIGS. 2 and 3. Worm gear 74 (see FIG. 2) is driven by worm 76 (see FIG. 3). Worm 76 is powered by the shaft of reversible electric motor 78. As hinge pin 66 (see FIG. 3) is turned through 90 degrees in the clockwise direction, thrust spoiler 60 assumes the activated position 60a, shown in dashed lines. Stopping electric motor 78 after it has turned the proper number of revolutions in either direction is readily accomplished by the use of microswitches which are actuated by a control arm clamped to hinge pin 66.

Other means for actuating thrust spoilers 60 could be used. For example, a hydraulic motor, a hydraulic piston, or an air piston could be used. The piston-type actuators would require that there be a crank arm connected to hinge pin 66 instead of the worm gear 74 shown in FIG. 2.

Whatever means of actuation is used, the need is to rotate plate 62 on command about hinge pin 66 such that it advances from contact with recessed lip 59 to actuated position 60a. Later, when the pilot wants to achieve maximum thrust for take-off, issuance of a counter-command signal should cause plate 62 to retract to the recessed position. It is important to note that whatever system is used for activation, all would incorporate a fail-safe system for spoiler retraction as engine thrust is increased beyond a pre-set level.

By mechanically linking the entire complement of thrust spoilers together, it has been found that several thrust spoilers can be driven from a single motor. This was accomplished by interconnecting one thrust spoiler station with the next, by means of a series of flexible cables 82 (see FIG. 2). These are serially attached from one hinge pin 66 to the next by use of collars 80. The cable transmits torque from one thrust spoiler 60 to the next even though adjacent thrust spoilers are angularly displaced by the radius of curvature of duct wall 58.

In summary, my invention provides a pilot with thrust spoilers which can be actuated to reduce the tendency of the high bypass turbofan equipped aircraft to creep forward on a taxi strip or flight ramp even though the speed of the engines has been reduced to ground idle. Further, the thrust spoilers of my invention can be actuated without need for additional adjustment of engine throttle parameters.

While I have shown only one embodiment of the thrust spoiler, it is understood that numerous variations in configuration are possible within the scope of the present invention. It should be apparent to those skilled in the art that the invention can be practiced in other forms without departing from its spirit and scope.

I claim:

1. In a turbofan engine having a driven fan rotating in an annular duct which is a continuation of the engine air intake, said fan providing an airstream which is divided, one part of said airstream being fed to the engine compressor of the gas producer unit, the other part of said airstream being ducted through an annular bypass which surrounds the turbine, apparatus for reducing the thrust output of the bypassing portion of the engine airstream at low throttle settings, said apparatus comprising:

a multiplicity of retractable spoilers placed at spaced apart intervals circumferentially around the outer wall forming the annular duct carrying the bypass airstream the active area of each of said spoilers being a generally rectangular plate; and means for positioning said spoilers to an actuated and a retracted position, said retracted position being that which recesses the generally rectangular plate of each of said spoilers into the outer wall enclosing said bypass ducting allowing air to freely flow therethrough when the spoilers are retracted, said actuated position being that which deploys said spoilers into the bypass air passage, said deployment being such that the forward facing side of each generally rectangular plate portion of each of said spoilers lies in a plane which is perpendicular to the axial centerline of said gas producer section; the deployment of said spaced apart spoilers being for the purpose of both partially blocking airflow in the bypass air passageway and at the same time creating turbulent air flow conditions within the passageway.

2. The invention as defined in claim 1 wherein each of said retractable spoilers comprise in combination:

a pair of supports extending radially outward from the outer wall enclosing said bypass ducting, each of said pair of supports locating the placement of a thrust spoiler station, each such pair of supports lying in a plane perpendicular to the axial centerline of said gas producer section, the outer ends of each of said supports being journaled, the journals of each pair of said supports being coaxially aligned;

a hinge pin rotatably mounted in said journaled supports; and a generally rectangular plate having mounting bracket connections for attaching said plate to said hinge pin, said mounting bracket connections including means providing for pivotal motion of said plate around said hinge pin from a retracted to an actuated position.

3. The invention as defined in claim 2 wherein the means providing for pivotal motion of said plate around said hinge pin includes a reversible motor having a gear drive.

4. The invention as defined in claim 2 wherein the width of each of said plates is dimensioned to match the cross-sectional height of the turbofan bypass ducting.

5. The invention as defined in claim 2 wherein the supports, extending radially outward from the outer wall enclosing said bypass ducting, have the centerlines of their journaled outer ends lying in a single plane, said plane being perpendicular to the axis of said gas producer section.

6. The invention as defined in claim 5 wherein adjacent thrust spoiler stations are mechanically linked by flexible cable means serially connecting one hinge pin with the next.

7. The invention as defined in claim 1 wherein there are at least four retractable spoilers.

* * * * *